(12) United States Patent
McKechnie

(10) Patent No.: US 8,089,633 B2
(45) Date of Patent: Jan. 3, 2012

(54) TEST METHOD FOR SURFACE FIGURE OF LARGE CONVEX MIRRORS

(76) Inventor: Thomas Stewart McKechnie, Albuquerque, NM (US)

(*) Notice: Subject to any disclaimer, the term of this patent is extended or adjusted under 35 U.S.C. 154(b) by 278 days.

(21) Appl. No.: 12/467,278

(22) Filed: May 17, 2009

(65) Prior Publication Data

US 2010/0157314 A1 Jun. 24, 2010

Related U.S. Application Data

(63) Continuation-in-part of application No. 12/343,683, filed on Dec. 24, 2008.

(51) Int. Cl.
*G01B 11/02* (2006.01)
(52) U.S. Cl. .................................. 356/513; 356/515
(58) Field of Classification Search ............ 356/124, 356/513–515
See application file for complete search history.

(56) References Cited

U.S. PATENT DOCUMENTS

| | | | | |
|---|---|---|---|---|
| 5,530,547 A * | 6/1996 | Arnold | ........................ | 356/458 |
| 7,072,042 B2 * | 7/2006 | Kim et al. | ..................... | 356/458 |
| 7,375,824 B2 * | 5/2008 | Kuhn et al. | .................... | 356/513 |
| 2005/0223539 A1 * | 10/2005 | Geuppert et al. | ............... | 29/593 |
| 2010/0157313 A1 * | 6/2010 | Mckechnie | ................... | 356/513 |

* cited by examiner

*Primary Examiner* — Michael A Lyons
(74) *Attorney, Agent, or Firm* — Kenneth E. Callahan

(57) ABSTRACT

A method of testing a convex mirror surface figure in which an optical quality substrate material is used having a convex front surface and a rear surface polished to a precise optical figure to create a lens. The lens is then tested by a standard interferometric or wavefront lens-testing method and the convex surface coated once a desired curvature is obtained. Null testing may be attained by passing a collimated interferometer beam through a focusing lens shaped to counter the predicted spherical aberration introduced by a perfect convex mirror/lens. A nominal rear surface figure of the mirror/lens may be used if a precisely figured test window is contacted with the rear surface using a refractive index-matching substance with an index of refraction closely matching the index of refraction of the test optic.

3 Claims, 11 Drawing Sheets

Hindle Sphere Test
(Prior Art)

Hindle-Simpson Test
(Prior Art)

Hindle-Simpson Test with a Shortening Lens
(Prior Art)

Test Setup of the Secondary Mirror
of the NASA 3-meter Telescope

Residual Wavefront Aberration For a Perfectly
Figured Mirror Lens Surface Set Up in
Double-pass As In FIG. 5

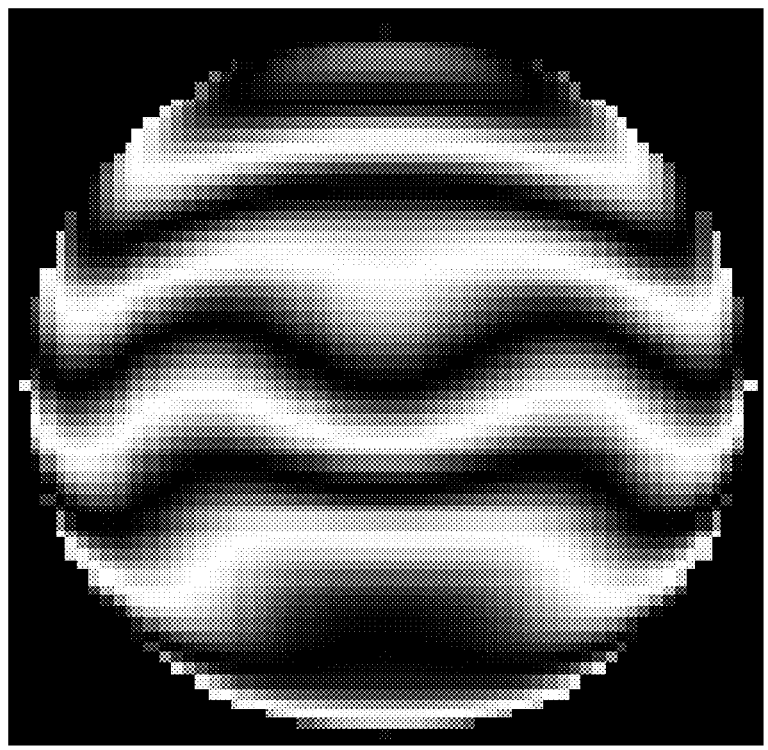
FIG. 7B
FIG. 7A magnified 50x
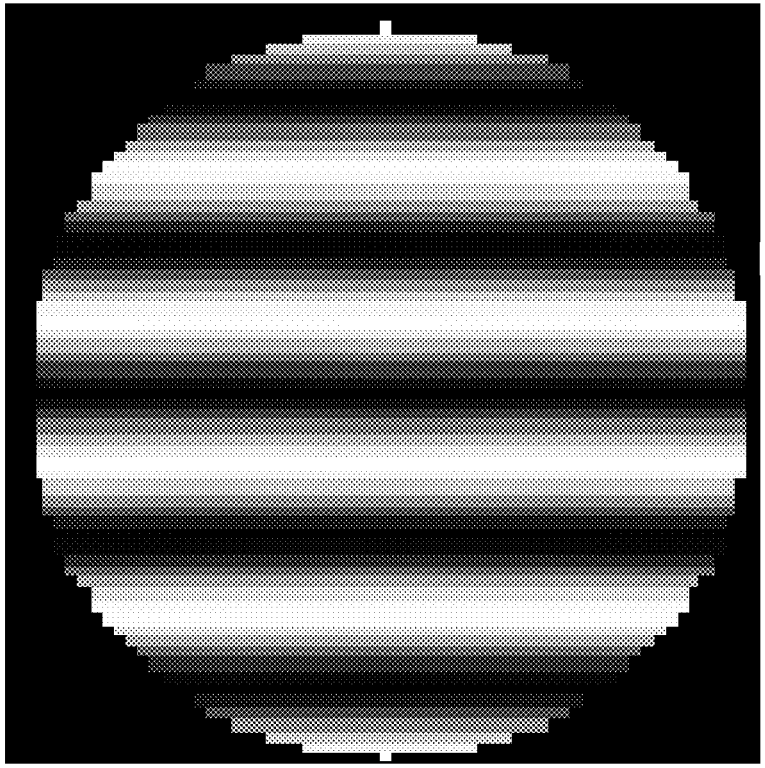
FIG. 7A
FIG. 7
Interferograms Obtained From FIG. 5 Setup
With 5 Waves of Tilt Introduced Test Windows Added to the Test Setup
Secondary Mirror of the NASA 3-meter Telescope

TEST METHOD FOR SURFACE FIGURE OF LARGE CONVEX MIRRORS

This application is a continuation-in-part of pending non-provisional application Ser. No. 12/343,683 filed on Dec. 24, 2008.

BACKGROUND

The invention relates generally to a method of testing the surface quality of convex mirrors, and, in particular, to using an optical lens quality material as the mirror substrate, polishing the rear surface of the substrate to a precise surface figure to thereby transform it into a lens, and testing this lens by standard interferometric or wavefront methods prior to applying a reflective coating to the convex surface.

Large convex mirrors are typically used as secondary mirrors in large reflecting telescopes. For example, the NASA 3-meter telescope on Mona Kea uses a 244-mm diameter secondary mirror having a hyperbolic surface figure. Currently the standard method for testing convex mirrors is the Hindle sphere test or the improved version, the Hindle-Simpson test. The Hindle test uses a spherical mirror that is significantly larger in diameter than the convex mirror under test and it must be perforated at its center. A diagram of the test set-up is shown in FIG. 1.

The convex mirror under test, the test optic 10, is tested at the same conjugates as used in the telescope by employing a Hindle Sphere 11, a spherical mirror with a central perforation. The center of curvature (CoC) of the Hindle Sphere is positioned at the near focus 12 of the convex surface under test. The diameter of the Hindle Sphere has to be greater than that of the test optic. Light from an interferometer 13 is brought to the null test point 14 at the far focus of the convex surface of the test optic. After reflections off the test optic 10 and the Hindle Sphere 11, the light re-traces its path back to the interferometer 13 where it produces fringes on a monitor 15 depicting the wavefront aberrations of the test optic.

A schematic of the Hindle-Simpson test set-up is shown in FIG. 2. This test makes use of a meniscus-shaped Hindle Sphere 20 and a concave calibration mirror 21. All surfaces in the arrangement are spherical. By designing the ancillary optics, in this case the meniscus-shaped Hindle Sphere and the concave calibration mirror, to lie close to the convex mirror under test 22, the diameters of these optics are minimized with corresponding reduction in cost of fabrication. Nonetheless, the diameters still have to be somewhat larger than the diameter of the test optic.

In large telescopes, astronomical or otherwise, the secondary mirror often directs the light to a focus through a central hole in the primary. The distance from the vertex of the secondary mirror to this focus can be many meters, perhaps more than 10 meters. To reduce the total length of the test setup, a shortening lens 30 is often used as shown in FIG. 3. The lens is often a plano-convex lens with spherical convex surface. Again, this lens has to have a diameter greater than the diameter of the mirror under test 31, further adding to the complexity and cost of the test setup.

There is a need for a less complex and less expensive method of testing the surface of a convex mirror to enable accurate measurement and characterization of its surface figure.

SUMMARY

A new method of testing the surface figure of a convex mirror is presented that allows a significant reduction in the complexity and size of the ancillary test optics, making their fabrication simpler and less expensive. In a preferred embodiment the convex mirror under test is first fabricated from a substrate material that is transmissive at the chosen test wavelength and has good optical homogeneity. The rear of the mirror is polished and figured to some convenient shape so that the mirror can now be tested as though it were a lens. The mirror, which may now be refer to as a "mirror/lens", can then be null tested at convenient conjugates that are not necessarily the same as those used by the mirror in its designed application. The combination of these three features potentially allows the ancillary optics to be constructed to a higher optical precision, which ultimately translates to more precise testing and characterization of the convex mirror surface under test.

Additional savings can be attained by the use of test windows made from any transmissive and homogeneous optical substrate material and shaped to the precise optical figure specifications required by the test. The test windows are optically contacted to nominally figured ancillary optical surfaces using refractive index matching substances. By choosing a sufficiently close refractive index match, gross surface figure errors in the ancillary optical surfaces can be effectively nullified without degrading test accuracy. By re-use of the test windows over many different enactments of the test, the initial costs of these windows may be amortized over time.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7A shows the fringe pattern for a perfectly figured mirror/lens showing residual wavefront aberrations obtained from the FIG. 5 test setup.

FIG. 7B shows the same fringe pattern as in FIG. 7A with wavefront error magnified 50× to show the otherwise imperceptible fringe-shape details.

DESCRIPTION OF THE PREFERRED EMBODIMENT

Current methods of testing the surface quality of convex mirrors involve ancillary optics that are significantly larger than the mirror under test. For secondary mirrors used in large telescopes, the test set-ups are quite large since the same conjugates are used as in the actual telescope. The present invention results in a significant reduction in the size and complexity of the ancillary test optics, making the fabrication and assembly of these optics simpler and less expensive and enabling greater optical precision.

To act as a lens, the substrate of the convex mirror under test has to be made from transmissive material. There are many types of glass, plastic, crystalline, and other materials from which to choose. Zerodur or fused silica might often be used because of their low thermal expansion coefficients. The material would have to have good optical homogeneity so that the substrate itself does not introduce significant wavefront aberrations.

The substrate material of convex mirrors is normally ground and polished to the required curvature and then coated with a reflective material. In the present invention, the substrate material of the mirror is fabricated from a material that transmits light at the chosen test wavelength and has good optical homogeneity. The front side of the substrate is shaped and polished to approximately the desired convex curvature. In addition the rear side of the substrate is shaped to a precise surface figure, thereby transforming the substrate into a lens. The simplest rear surface figure would be an optical flat. However, this surface could be any other spherical or aspheric, convex or concave shape, depending on how the test is configured. Iteratively testing and polishing the test optic until a desired convex surface quality is obtained may then be carried out using a standard interferometric or wavefront lens-testing method. Once the desired convex surface is obtained, the surface is coated with a reflective material to thereby produce the desired convex mirror.

Figure 4:
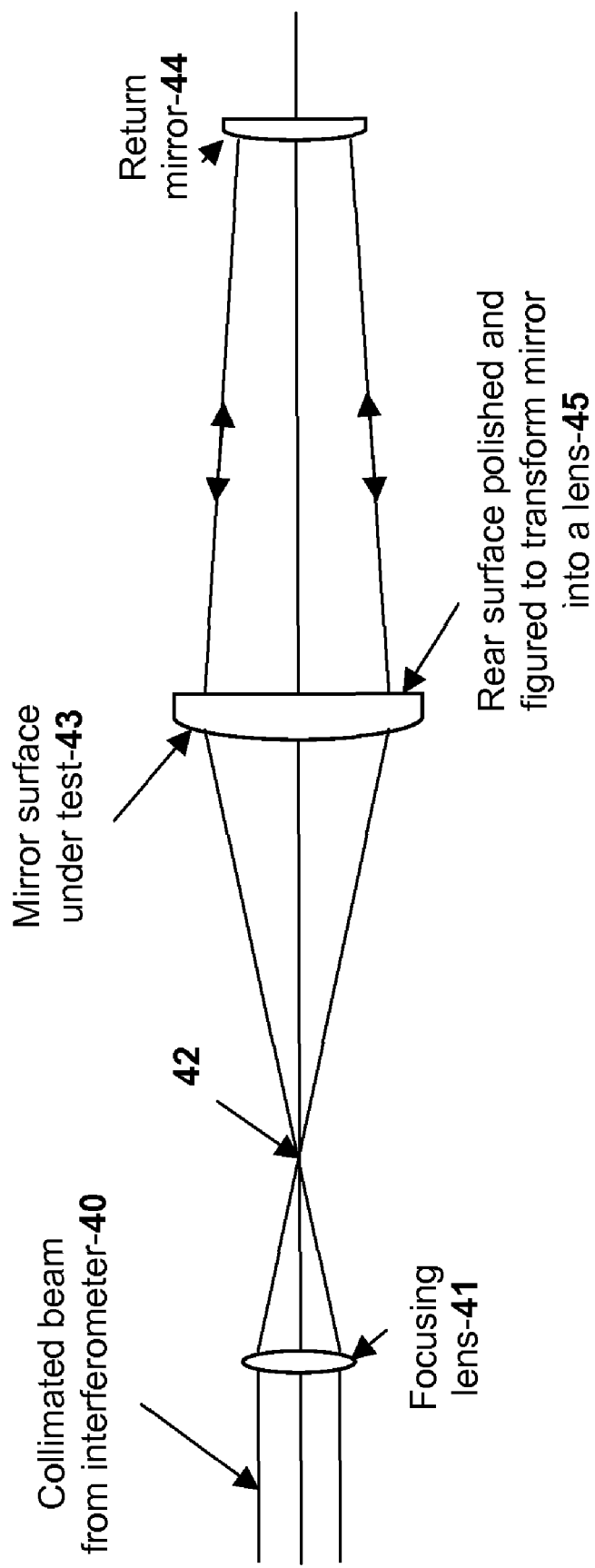
FIG. 4 is a schematic of an interferometric test configuration for testing the surface figure of a convex mirror/lens as per the present invention.

The surface figure of this mirror/lens, referred to as the test optic, may also be tested at convenient imaging conjugates that are not necessarily the same as those used by the mirror in its final application, enabling much simpler and more compact geometries. FIG. 4 shows a schematic of one test arrangement in which a standard interferometer transmits a collimated beam 40 through a focusing lens 41. The focusing lens initially converges the beam to a spot 42. The beam then diverges. The test optic 43 is located at a point where the diverging beam fills the test optic lens. The beam passes through the test optic and is reflected back through the test optic by a return mirror 44. It then passes through the focusing lens and creates a fringe pattern (not shown) determined by the irregularities in the convex surface under test. The two ancillary optics, focusing lens 41 and return mirror 44, may now be much smaller than the test optic. The rear surface of the test optic 45 may be flat, concave or convex, spherical or aspheric, depending on the configuration and shape of the return mirror used.

Flat surfaces would normally be preferred over curved ones for cost reasons, consistent with achieving satisfactory performance from the ancillary optics. The next choice would be spherical surfaces, concave or convex. Although aspheric ancillary optics surfaces are also envisaged, they would only be used if there were clear benefit, such as improving the accuracy of the test.

Figure 5:
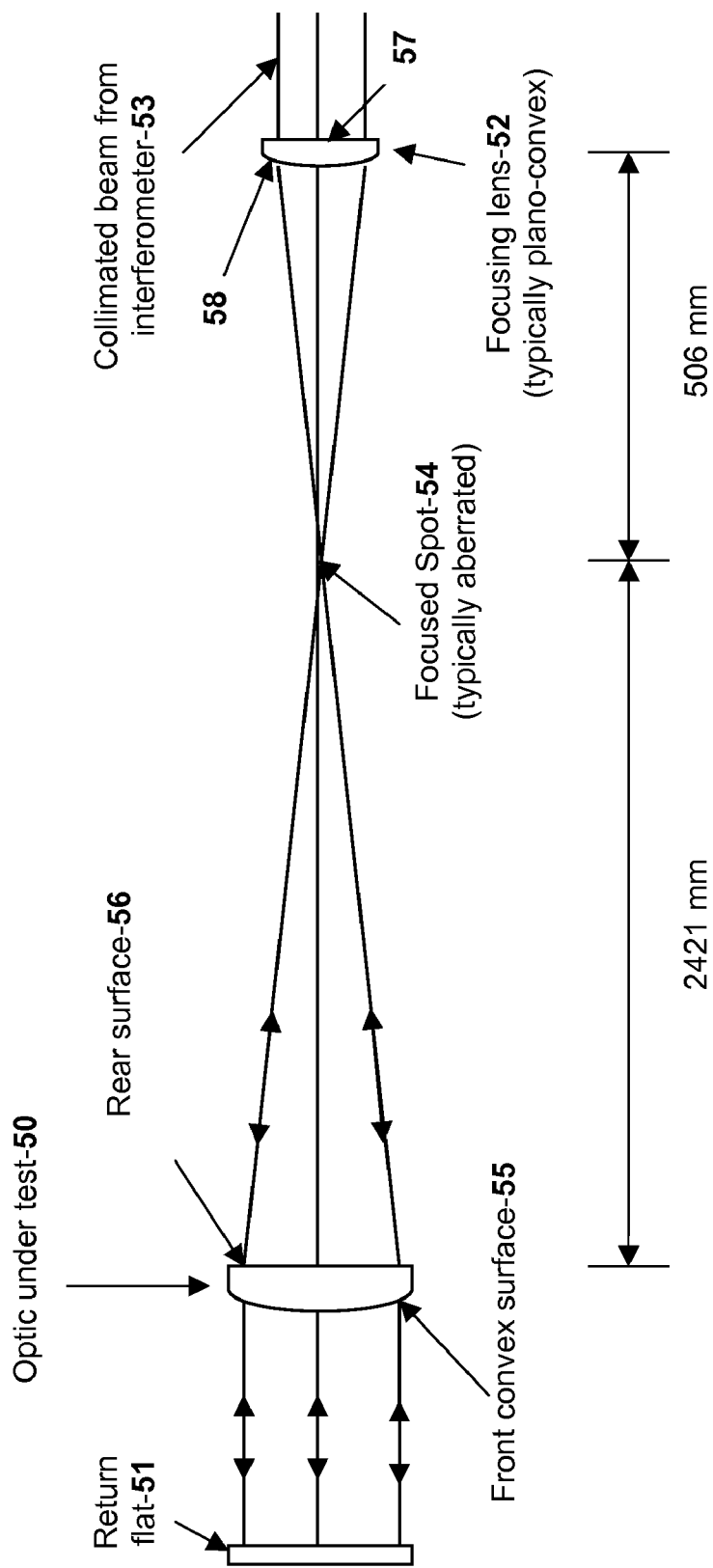
FIG. 5 is a schematic for testing the secondary mirror of the NASA 3-meter telescope offered as one example of the present invention.

As an example, the testing method was applied to the 244-mm diameter secondary mirror of the NASA 3-meter telescope as shown in FIG. 5. The requirement for this mirror is that, when combined with the 3-meter telescope primary mirror, diffraction limited performance is delivered ($<\lambda/4$ HeNe). Prior knowledge of the surface figure of the 3-meter primary mirror had previously been established by measurement. Based on this knowledge, NASA deemed that the ideal secondary mirror prescription is as follows:

Substrate material: Zerodur
Diameter: 244 mm
Radius of curvature: 1311.6 mm
Conic constant: k=−1.2068
Vertex thickness: 19.304 mm As setup in FIG. 5, the aspheric surface 55 of the mirror/lens (test optic 50) is chosen facing the return flat 51, a choice that leads to significantly reduced complexity of the ancillary optics. For testing other types of convex mirrors, the test optic could of course be reversed to face the other direction. In designing the test setup for this mirror, the preferred objective is to create a null test. In a null test, the ancillary optics are arranged such that a perfectly figured mirror under test would produce a null fringe pattern. A further objective is to make the ancillary tests optics as small, simple and inexpensive as possible, consistent with achieving the required test accuracy.

Although a flat return mirror 51 is shown in FIG. 5, in general there is no need to restrict to flat surfaces. If the return mirror were concave or convex spherical as in FIG. 4, its diameter could then be significantly smaller than the diameter of the test optic.

The layout shown in FIG. 5 comprises (on the right) a plano-convex spherical focusing lens 52 with the following specifications:

Substrate material: Fused silica
Lens type: Plano-convex (spherical)
Diameter: ~60 mm
Clear Aperture (CA) diameter: 50.8 mm
Radius of curvature: 391 mm
Vertex thickness: 15 mm The actual diameter of the focusing lens is chosen larger than the 50.8-mm CA diameter to ensure good optical figure over the CA. The lens brings the collimated beam 53 from the interferometer to a focused spot 54 at distance of 506 mm. The beam then diverges over a further 2421-mm path to fill the 244-mm diameter test optic. As shown, the distance from the focused spot to the mirror/lens is exactly the same as the focal length of the mirror/lens. As a result, the mirror/lens collimates the light towards the 244-mm diameter return flat 51. After reflecting from the return flat, the beam retraces its path back into the interferometer where it produces fringe patterns (not shown) representing the figure errors of the mirror/lens surface 55 under test.

Set up as in FIG. 5, the test optic introduces a significant amount of spherical aberration. The plano-convex-spherical focusing lens 52 is therefore designed to introduce an equal and opposite amount of spherical aberration. The degree of compensation achieved in the double-pass arrangement shown in FIG. 5 is such that the test constitutes a null test to high accuracy. Residual (uncorrected) wavefront error is less than $\lambda/120$ (HeNe). Consequently, whereas the convex surface under test 55 in FIG. 5 is not tested at its natural null points, as it would with the Hindle Sphere test, the test is nonetheless a null test in every other sense.

Figure 6:
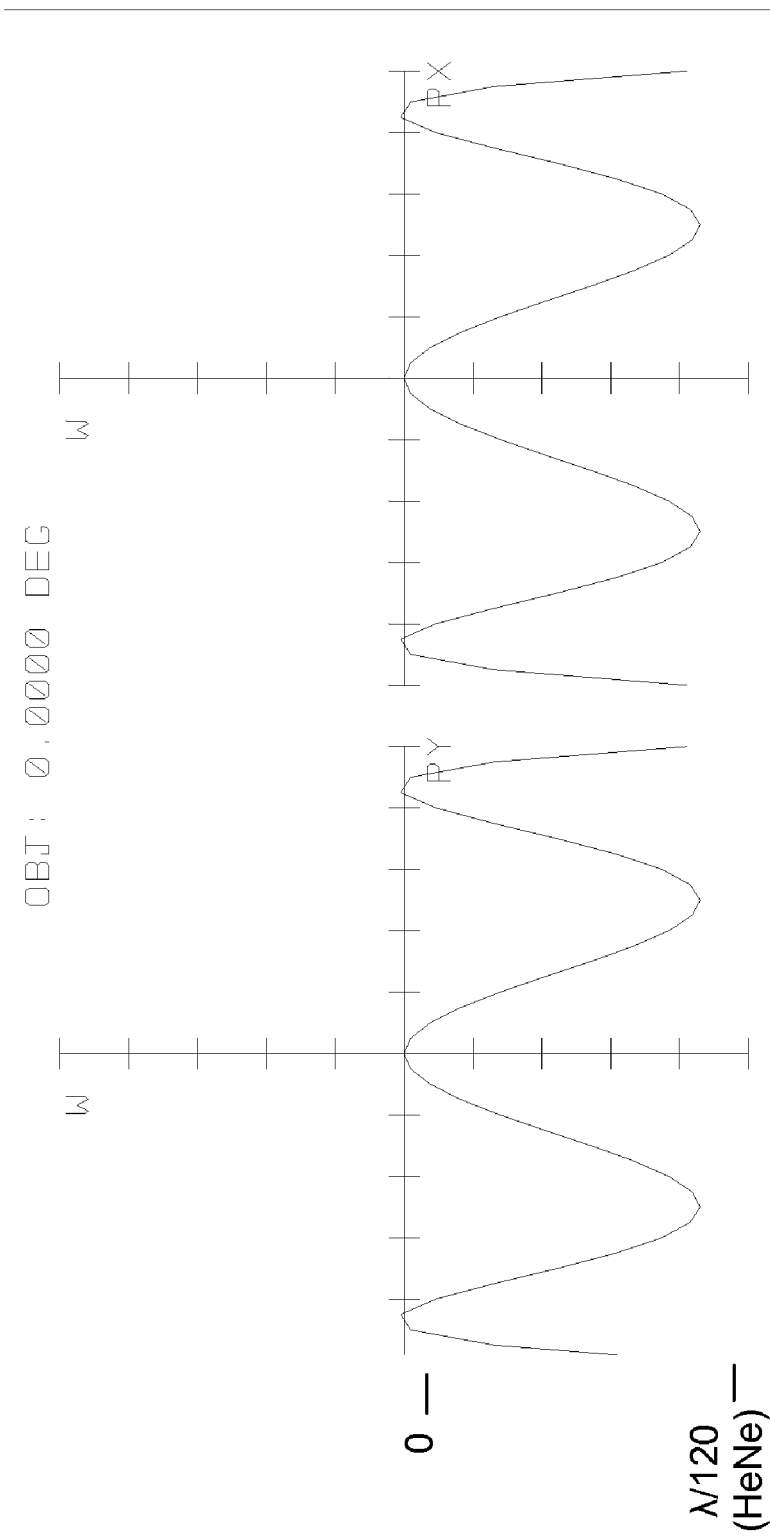
FIG. 6 is a plot of the residual wavefront aberration for a perfectly figured mirror/lens surface set up in double-pass as in FIG. 5.

Expanding on this, if the 244-mm diameter secondary test optic were to have the ideal, perfectly figured aspheric surface (radius of curvature 1311.6 mm, and conic constant −1.2068) and the rear surface were perfectly flat, and the return mirror were also perfectly flat, and the plano-convex-spherical lens surfaces were also perfectly figured, the residual double-pass wavefront aberration would be less than $\lambda/120$ (HeNe) as shown in FIG. 6.

The fringe pattern corresponding to the FIG. 6 double-pass wavefront aberration is shown in FIG. 7A. FIG. 7B is a 50×-magnified view of the FIG. 7A fringes. The fringes in FIG. 7A look almost perfectly straight indicating an extremely well figured test optic convex surface. Of course, by use of more sophisticated ancillary optics, residual wavefront aberration could be reduced further, or eliminated altogether, so that a true null fringe pattern could be obtained.

Figure 8:
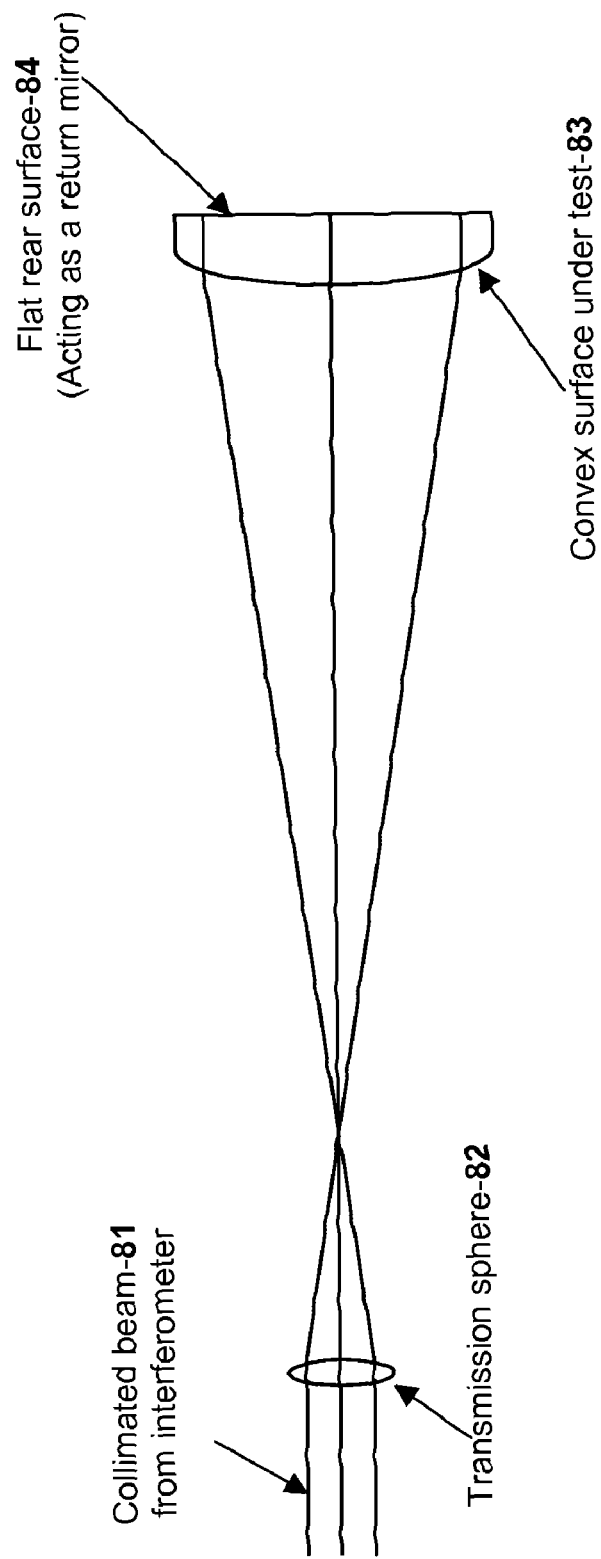
FIG. 8 shows a simple test set-up using an interferometer equipped with a transmission sphere.

If an interferometer producing the collimated beam 81 is equipped with a transmission sphere 82, in principle, the only additional requirement to test a convex mirror 83 would be to polish the rear surface flat 84 so that this surface acts as the return flat. Such an arrangement is shown in FIG. 8.

Generally, the transmission reference sphere does not compensate for spherical aberration generated by the double-pass through the test optic. Transmission spheres generally provide near-perfect spherical wavefronts entirely free of any sort of spherical aberration. Therefore, it is not usually possible to use the FIG. 8 arrangement as a null test. Tested as in FIG. 8, a perfectly figured convex surface of the test optic would produce a non-zero but predicable wavefront error. If predicted wavefront error data were subtracted from the measured fringe pattern, a pseudo-null fringe pattern would result.

Interpretation of Fringe Patterns and Assessment of Surface Figure Error.

For a mirror surface tested in reflection, a surface height error, H, produces wavefront error, W, as follows:

$$W = 2H \quad (1)$$

When the same surface is tested in transmission, as in a lens, exactly the same surface height error, H, gives rise to wavefront error, W, given by $$W = (n-1)H \quad (2)$$

where n is the refractive index of the substrate material used to make the mirror.

For many types of glass, n is about 1.5 but other glass types have refractive indices greater than 2. For crystalline substrates, n may be even higher. For Zerodur, as used in the FIG. 5 setup, n=1.54 at HeNe (633 nm). Equation (2) then becomes $$W = 0.54H \quad (3)$$

In the FIG. 5 test, the beam passes through the fused silica mirror/lens twice. In this case the wavefront error is given by $$W = 2.(n-1)H = 1.08H \quad (4)$$

Comparison of Equations (1) and (4) indicates that the test method described in this disclosure is about 2 times less sensitive than is the case when mirrors are tested in reflection. To illustrate the difference, for a 1-micron surface height irregularity, under the standard test in reflection described by Equation (1), we should expect to see $2H/\lambda \approx 3.2$ fringes (HeNe). Under the mirror/lens test (Equation 4) we should expect to see $1.08H/\lambda \approx 1.75$ fringes (HeNe).

Figure 1:
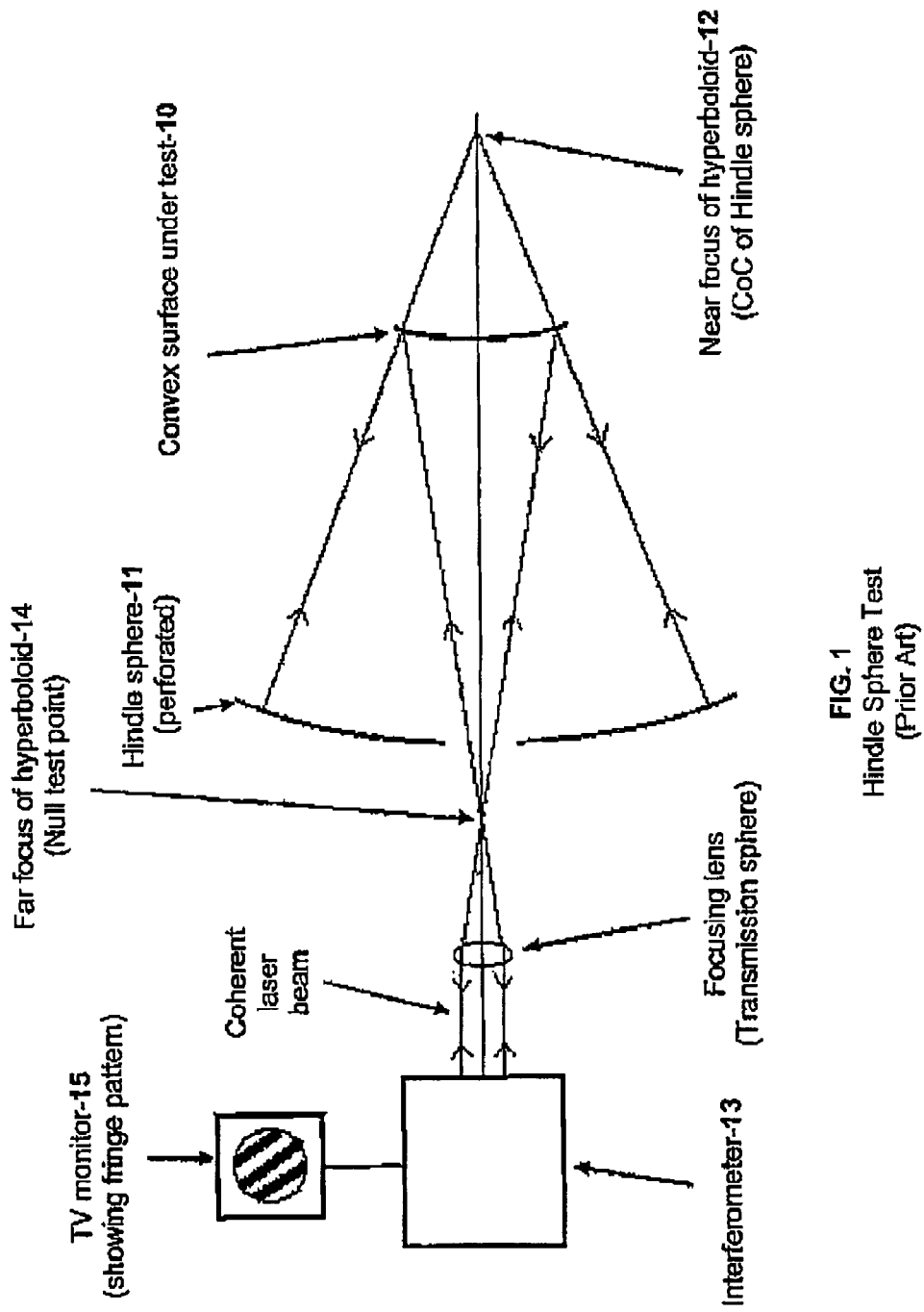
FIG. 1 is a schematic of the Hindle sphere test set-up for testing a convex mirror.
Figure 2:
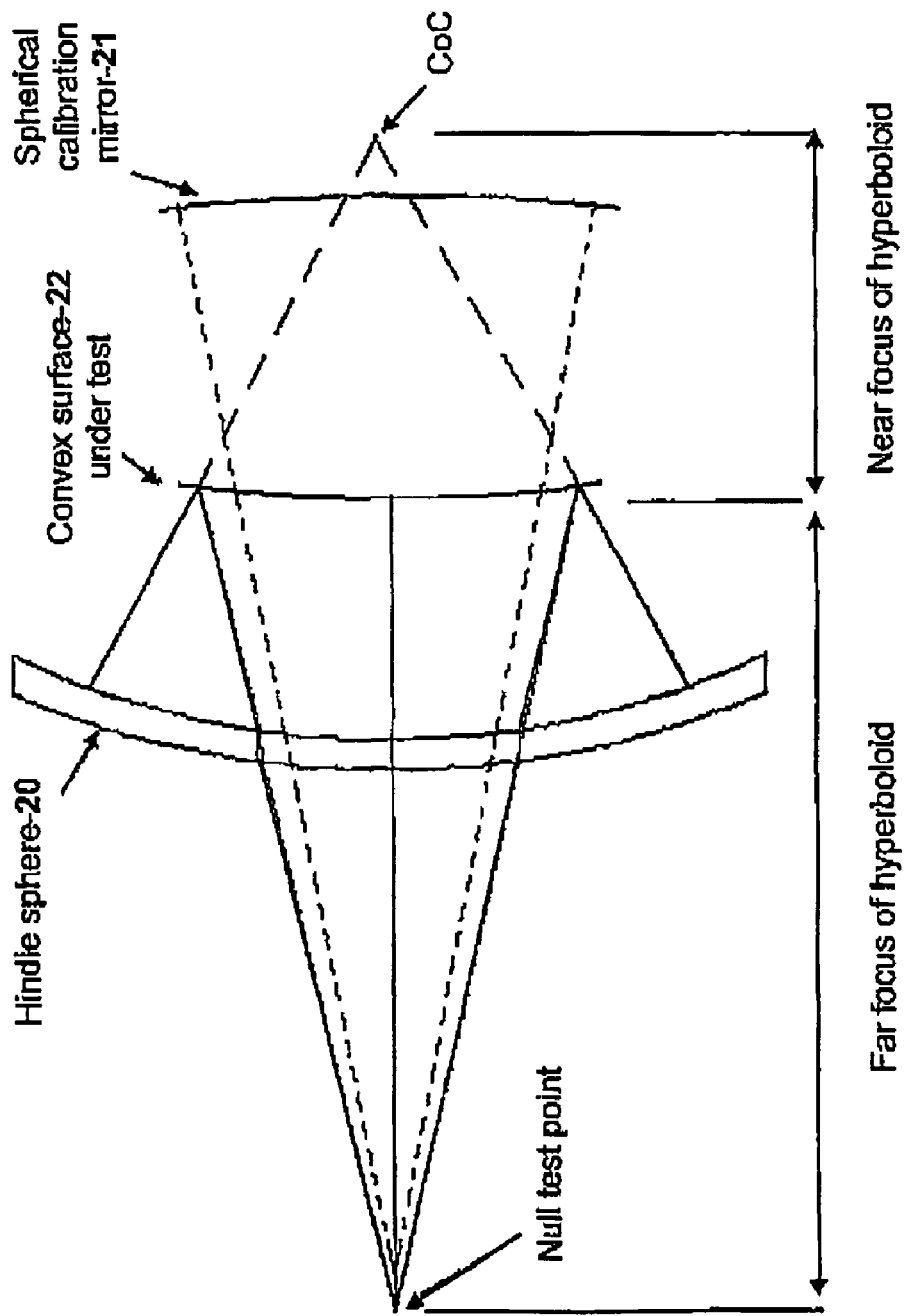
FIG. 2 is a schematic of the Hindle-Simpson sphere test set-up.
Figure 3:
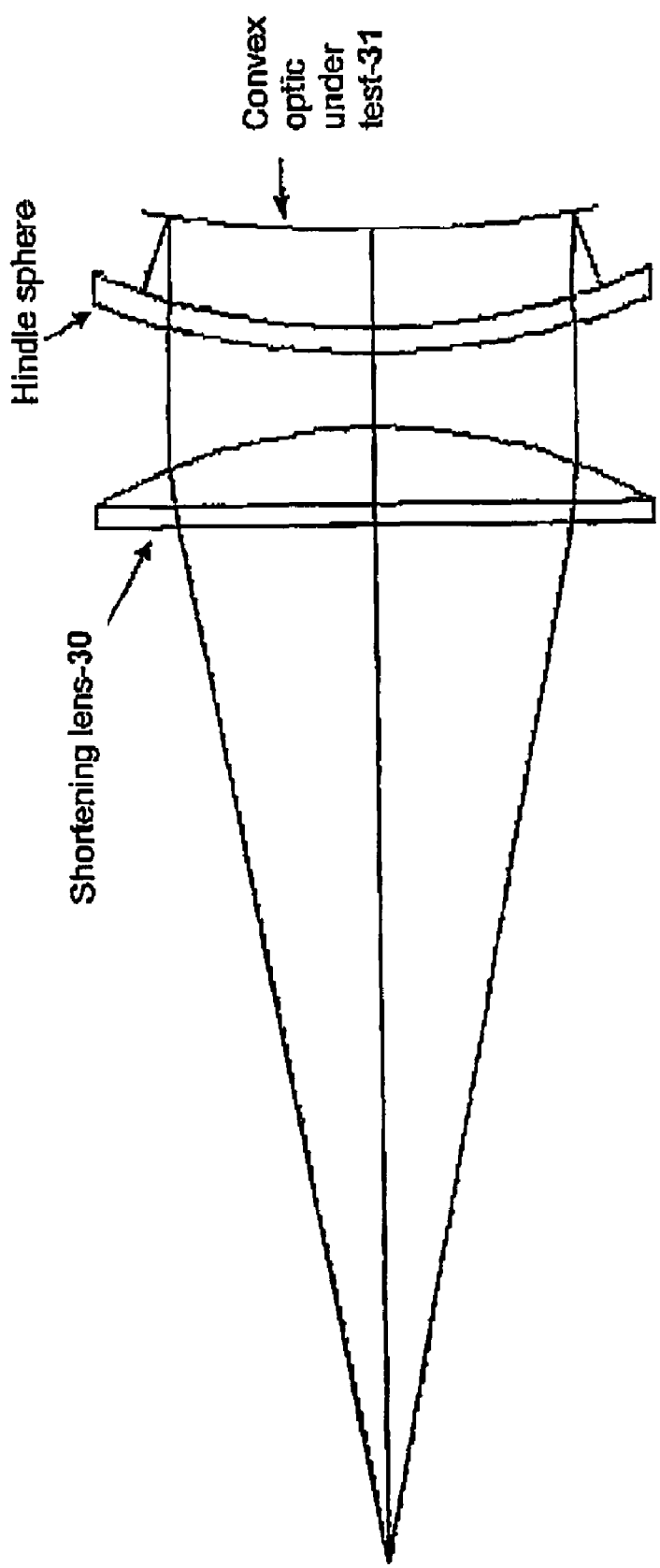
FIG. 3 shows the Hindle-Simpson test schematic where a shortening lens is used to reduce the total path length and produce a more compact arrangement.

With the Hindle Sphere test illustrated in FIG. 1, the beam two reflections off the convex mirror under test. For this case, wavefront aberration, W, is given by $$W = 4H \quad (5)$$

The test sensitivity of the present invention is about 1.85× less than that of a standard mirror interferometric test where there is a single-reflection (c.f. Equations 1 and 4). The test sensitivity of the present invention is about a 3.7× less than that of a Hindle Sphere where there are two reflections from the mirror surface under test (c.f. Equations 4 and 5).

Use of Test Windows to Further Reduce Cost and Time.

The mirror/lens test setup as illustrated in FIG. 5 shows a standard interferometer transmitting a collimated beam 53 through a focusing lens 52. The focusing lens initially converges the beam to a spot 54. The beam then diverges. The test optic 50 is located at a point where the diverging beam fills the test optic lens. The beam passes through the test optic 50 and is reflected back through the test optic by a flat return mirror 51. It then passes through the focusing lens and creates a fringe pattern (not shown) determined by the irregularities in the convex surface under test 55. The two ancillary optics, focusing lens 52 and return mirror 51, may now be much smaller than the test optic.

The front convex surface 55 figure of the mirror/lens optic under test 50 (the secondary convex mirror of the NASA 3-meter telescope in this example) is the subject of the test. Three additional precision optical surfaces, however, are required in this test setup. These surfaces, referred to as "ancillary optical surfaces" are comprised of the flat surface on the rear of the optic under test 56, and the flat 57 and curved 58 surfaces of the focusing lens 52. The exact figure accuracy required of these ancillary optical surfaces depends on the accuracy required of the test, typically ½0th wave figure accuracy. Consequently, a significant portion of the cost and time invested in setting up the test is directed to fabricating the ancillary optical surfaces.

Figure 9:
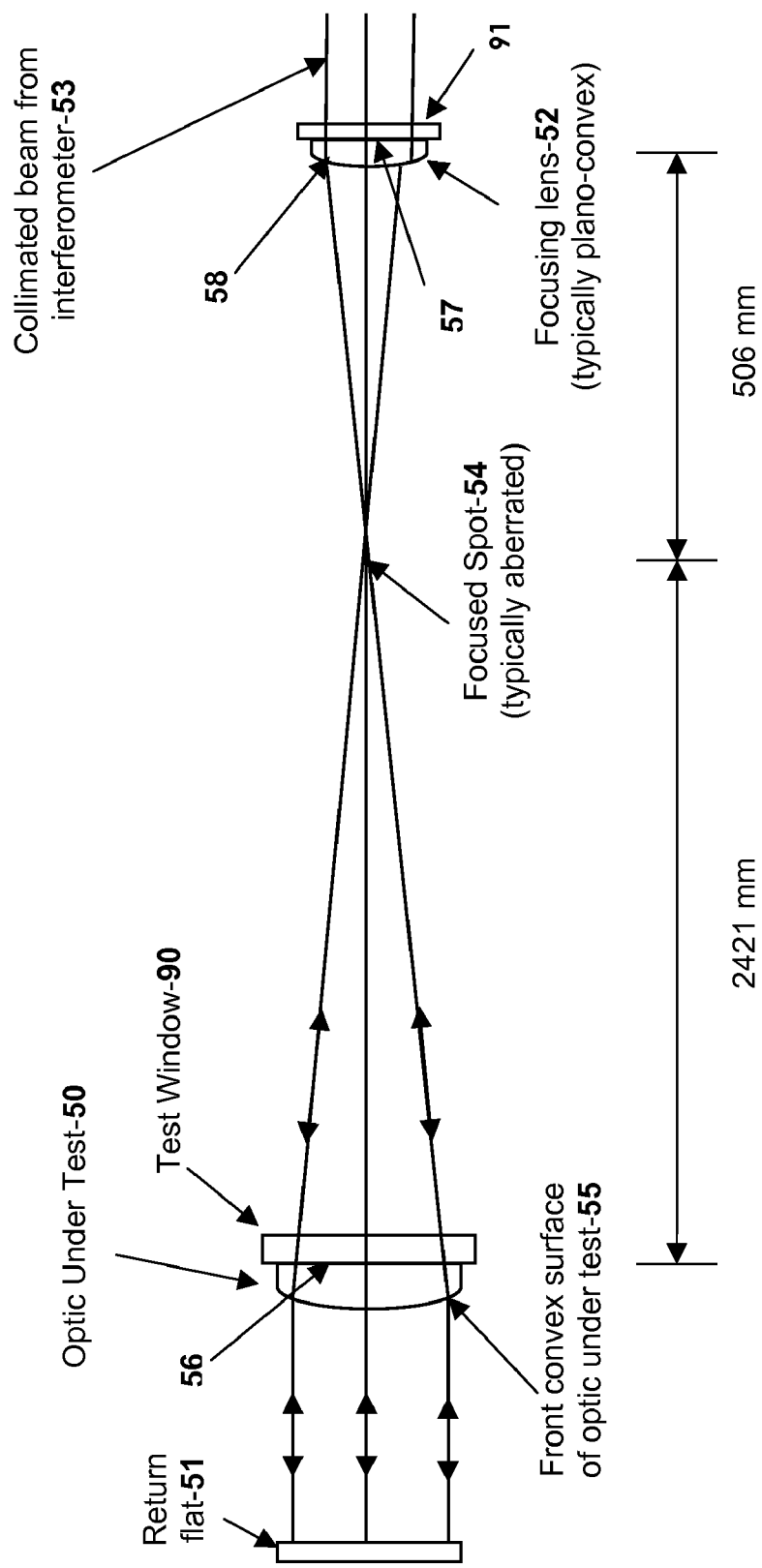
FIG. 9 shows test windows added to the test setup of FIG. 5.

FIG. 9 shows a second setup that performs essentially the same test as that of FIG. 5 and delivers the same test accuracy while significantly reducing the time and cost involved. A test window 90 is optically contacted to the flat surface 56 of the optic under test 50 and another test window 91 to the flat surface 57 of the focusing lens 52. Refractive index-matching substances are used at the contact interface. The refractive indices are chosen to closely match those of the optic under test and the focusing lens, respectively. The use of these two test windows allows the surface figured accuracy of the two flat surfaces of the ancillary optics to be relax to some nominal amount, typically to 10 waves (HeNe) or, in this example, by a factor 200×. The nominal surface figure accuracy might have a range of 1 to 50 wavelengths of the test frequency. The test windows themselves have a surface figure accuracy of $\frac{1}{20}^{th}$ wave (HeNe) or whatever accuracy standard is required and they can be used over and over again in other test setups. In the example presented, the test windows are plane parallel surfaces that are relatively inexpensive optical commodities. Even a single use would save significant time and money since both the optic under test and the focusing lens could have flat surfaces with relatively gross surface figure errors when employing plane parallel test windows in the setup.

Refractive index matching substances typically comprise liquids, adhesives, or other substances. It can be shown that the surface figure relaxation factor is given by $(n-1)/\Delta n$, where n is the nominal refractive index and $\Delta n$ is the refractive index matching accuracy. A refractive index liquid manufacturer, Cargille Laboratories, advertises an index matching accuracy of $\Delta n \sim 0.0002$, with $n \sim 1.5$. For this example, the formula gives the very large relaxation factor of 2500. An index matching accuracy range of $\Delta n = 0.01$ to 0.0002 would be consistent with a nominal surface figure accuracy of 1 to 50 wavelengths.

Figure 10:
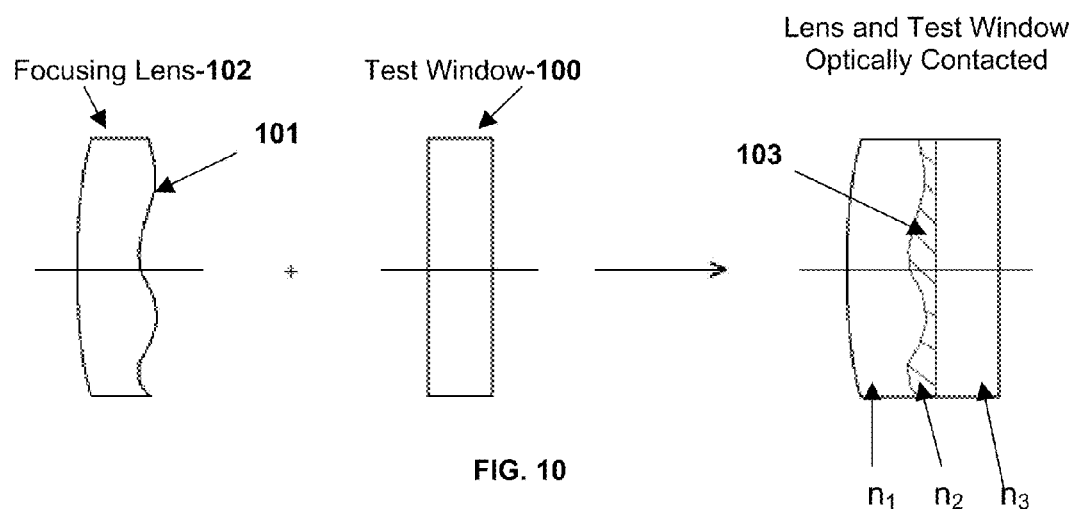
FIG. 10 illustrates the optical contact of a test window to a rough, nominally flat surface such as the flat surface of a plano-convex focusing lens.

FIG. 10 shows in more detail the optical contacting of the test window 100 to the approximately flat surface 101 of the focusing lens 102 using a refractive index-matching substance 103. The index of refraction $n_1$ of the focusing lens is closely matched to the index $n_2$ of the index-matching substance. It is not necessary for the index of the test window, $n_3$, to match that of the focusing lens in this example. The index-matching substance fills in the irregularities of the focusing lens's approximate flat surface, transforming it into a high precision flat surface.

Figure 11:
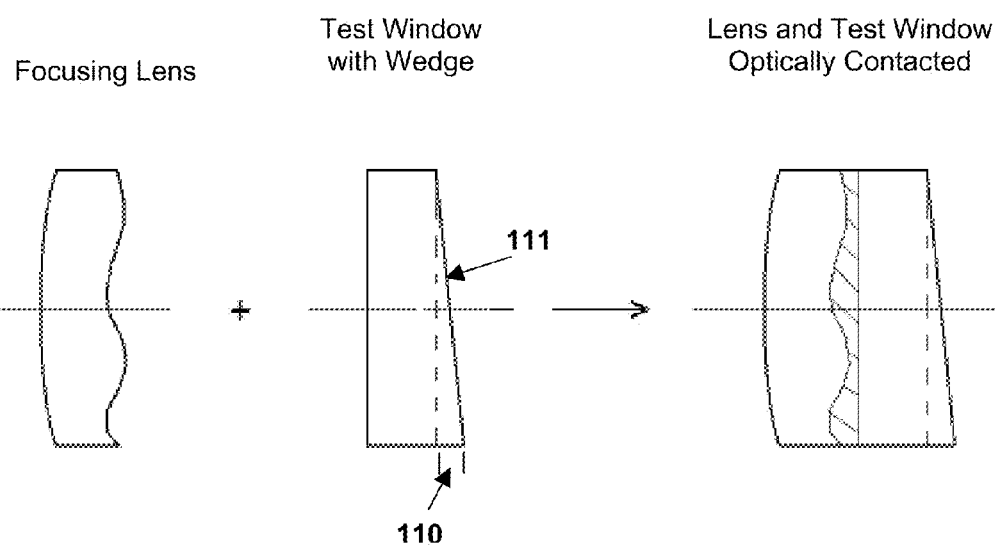
FIG. 11 illustrates a test window with a wedge in optical contact with a nominally flat surface.

With the test setups shown in FIGS. 5 and 9, the flat surface on the right side of the focusing lens creates an unwanted interference fringe pattern (not shown), which may confuse interpretation of the fringes of interest. To eliminate the unwanted pattern, a wedge angle 110 can be fabricated into the test window as shown in FIG. 11. While the now-tilted surface 111 nearest to the interferometer continues to produce an interference pattern, by prescribing a large enough wedge angle (typically a few arc-minutes), fringe density increases to a level where the fringes become invisible for the purposes of the test. As shown in FIG. 11, the wedge angle is incorporated into a collimated portion of the interferometer beam. Therefore, the wedge angle does not introduce off-axis aberrations, such as coma or astigmatism, that otherwise might complicate interpretation of the test fringes, thus preserving test integrity and, in particular, null test integrity.

Figure 12:
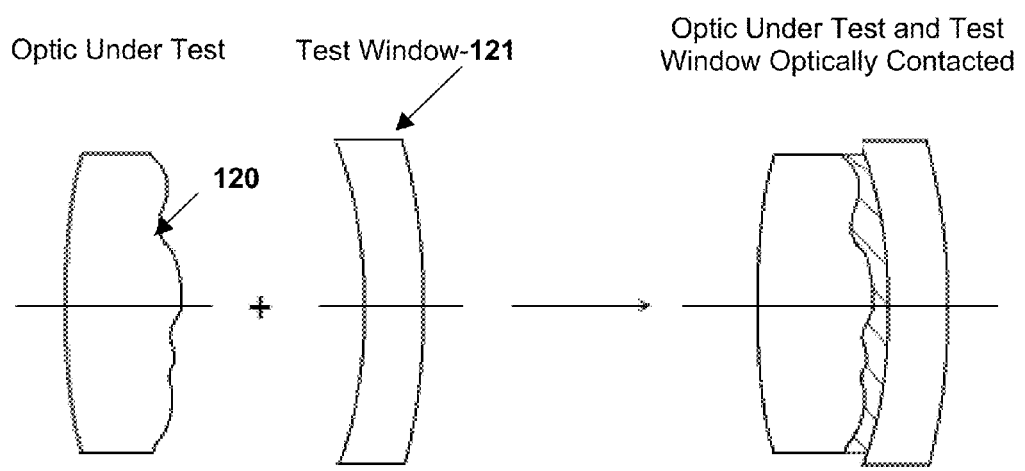
FIG. 12 shows a curved test window in contact with a rough curved lens surface, such as might be used by the optic under test.

Sometimes, it may be beneficial to curve the rear surface of the optic under test, particularly if it helps to provide a more precise null test. In cases where more than one convex mirror has to be fabricated and tested to the same recipe, it might be less costly to figure the rear surface of the optic under test to only a nominal curvature, say to within ~10 waves (HeNe). In the case shown in FIG. 12, the residual figure errors of the nominally-shaped surface 120 can be compensated by using an appropriately curved and precisely figured test window 121. Convex curvature is shown in the figure, but of course concave is also possible. The two sides of the test window can have similar curvature as in FIG. 12 or different curvature. They may also be flat, as convenient.

Figure 13:
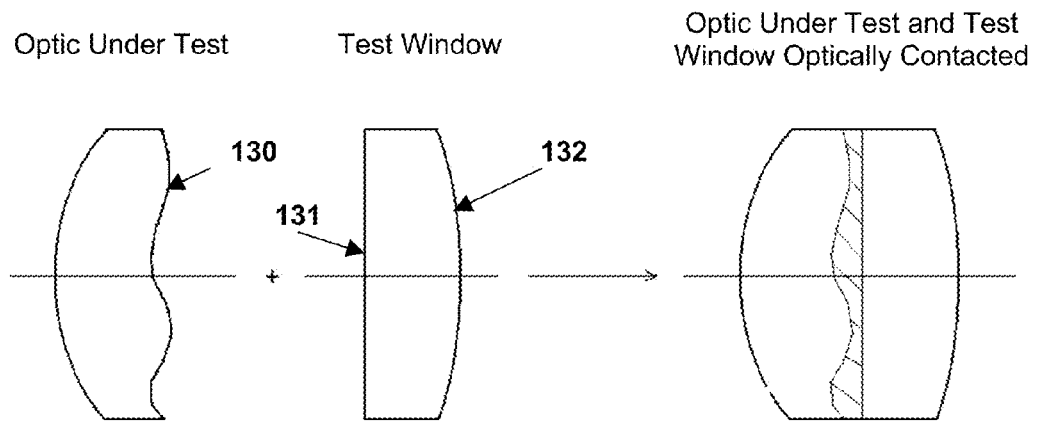
FIG. 13 illustrates how a nominally flat rear surface of the optic under test may be transformed into a precisely curved rear surface by optically contacting a curved test window comprising on one side a precisely figured flat and on the other side a precisely figured curve.

FIG. 13 illustrates a second way of providing a "curved" rear surface in the optic under test. The rear surface 130 has been shaped to nominal flatness—typically to 10 waves (HeNe). For this example, the test window must have a precisely flat surface 131 towards the optic under test. The other side must have a precisely curved surface 132, convex as shown, but concave being equally possible, as convenient. As before, the test window is optically contacted to the optic under test using precise refractive index matching.

As illustrated in FIG. 5, often the requirement is for flat ancillary optical surfaces. However, the present invention is not limited to such surfaces; other surface shapes, including convex, concave, spherical, and aspheric are also envisaged. The wavelength used in the mirror/lens test method can be any UV, visible, or IR wavelength. HeNe (633 nm) is commonly used. Rough-ground or machine-generated surfaces can often be flat to within 50 microns. By using sufficiently close refractive index matching, a final polishing and figuring stage for the ancillary optical surfaces might not be necessary. More commonly, however, nominal levels of polishing and figuring would be used. The effect of residual grayness, i.e., incomplete polishing of the ancillary optical surfaces is substantially eliminated using even crude refractive index matching ($\Delta n \sim 0.01$). Thus, the present invention can allow residual post-polishing grayness to be tolerated.

Test window substrates can be made out of any optically homogeneous material that is transmissive at the test wavelength. Typical materials are Zerodur, fused silica, BK7 glass, Pyrex, zinc selenide, but many other glass, plastic, crystalline and other materials could also be used. Zerodur and fused silica are particularly useful because of their low thermal expansion coefficients. Whereas test windows may be expensive due to the requirement for precise surface figure, the cost may be amortized by repeated use of the same test window in different applications of the test method.

From the foregoing it will be appreciated that the convex mirror testing method of the present invention employs smaller diameter and less expensive ancillary optical components. The method further provides a null testing method that may be set up at convenient conjugate distances.

The invention claimed is:

1. A method for producing a convex mirror having a desired surface figure quality wherein the mirror under test, the test optic, is treated as a lens prior to applying a reflective coating to the convex surface of the test optic substrate, the method comprising the steps of:
   a) choosing an optical lens quality material for the test optic substrate, the test optic having a front convex surface side and a rear surface side;
   b1) polishing the rear surface of the test optic to a nominal surface figure of between 1 and 50 test wavelengths;
   b2) contacting the rear surface of the test optic to a test window, the test window being made from any transmissive and homogeneous optical substrate material and having front and rear surfaces shaped to desired precise surface figures, using a refractive index-matching substance with an index of refraction n matching the Index of refraction of the test optic within a refractive Index matching accuracy of $\Delta n=0.01$ to $0.0002$;
   c) iteratively testing and polishing the front convex surface of the test optic until a desired convex surface quality is obtained using a standard Interferometric or wavefront lens-testing method at a desired test wavelength; and
   d) once the desired convex surface is obtained, coating the convex surface with a reflective material to thereby produce the desired convex mirror.

2. A method for testing the optical surface quality of a convex mirror, the test optic, wherein the test optic is first transformed into a lens and tested prior to applying a reflective coating to the convex surface of the test optic substrate comprising the steps of:
   a) choosing an optical lens quality material for the test optic substrate, the test optic having a front convex surface side and a rear surface side;
   b1) polishing the rear surface of the test optic to a nominal surface figure of between 1 and 50 test wavelengths;
   b2) contacting the rear surface of the test optic to a test window, the test window being made from any transmissive and homogeneous optical substrate material and having front and rear surfaces shaped to desired precise surface figures, using a refractive index-matching substance with an index of refraction n matching the index of refraction of the test optic within a refractive index matching accuracy of $\Delta n=0.01$ to $0.0002$;
   c) passing a collimated beam at a desired test wavelength from an interferometer through a transmission sphere producing near-perfect spherical wavefronts that pass through both front and rear surfaces of the test optic, are reflected back from a return mirror, back through both surfaces of the test optic, and then back through the transmission sphere to produce a wavefront error measurement of the front convex surface; and d) determining the test optic convex surface error by subtracting a predicted wavefront error based on a desired test optic convex surface from the measured wavefront error.

3. A null-testing method for determining the optical surface quality of a convex mirror wherein the mirror under test, the test optic, is treated as a lens prior to applying a reflective coating to the convex surface of the test optic substrate comprising the steps of:
- a) choosing an optical lens quality material for the test optic substrate, the test optic having a front convex surface side and a rear surface side, the desired convex surface having In general an aspherical curvature that introduces a spherical aberration that can be pre-calculated when tested at conjugates other than those intended in its final application;
- b1) polishing the rear surface of the test optic to a nominal surface figure of between 1 and 50 test wavelengths;
- b2) contacting the rear surface of the test optic to a test window, the test window being made from any transmissive and homogeneous optical substrate material and having front and rear surfaces shaped to desired precise surface figures, using a refractive index-matching substance with an index of refraction n matching the index of refraction of the test optic within a refractive index matching accuracy of $\Delta n = 0.01$ to $0.0002$; and
- c) passing a collimated beam at a desired test wavelength from an interferometer through a focusing lens designed to introduce an equal and opposite amount of spherical aberration to that calculated for the desired test optic and to fill the test optic lens with the interferometer beam, through both front and rear surfaces of the test optic, being reflected back from a return mirror, back through both surfaces of the test optic, and then back through the focusing lens to form a null interference pattern if the test optic has the desired convex surface.

\* \* \* \* \*